Sept. 22, 1936.  E. H. RAYMOND  2,055,110
BATTERY LAYING CAGE AND METHOD OF FEED DISTRIBUTION THEREIN
Filed June 17, 1933  2 Sheets-Sheet 1
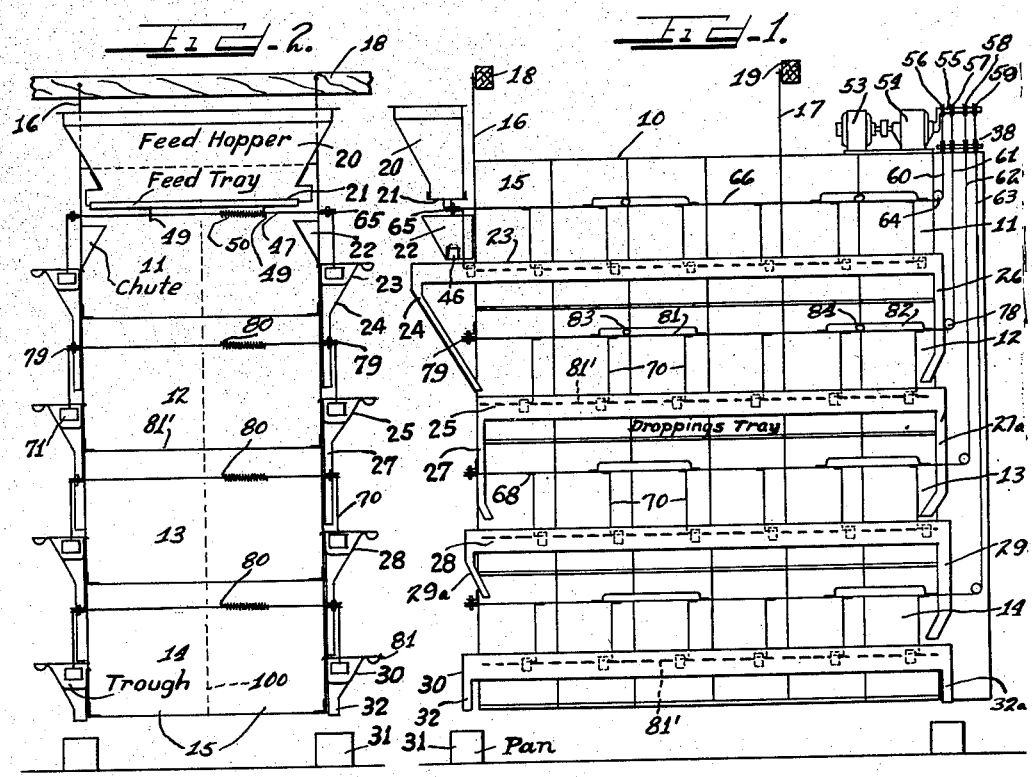

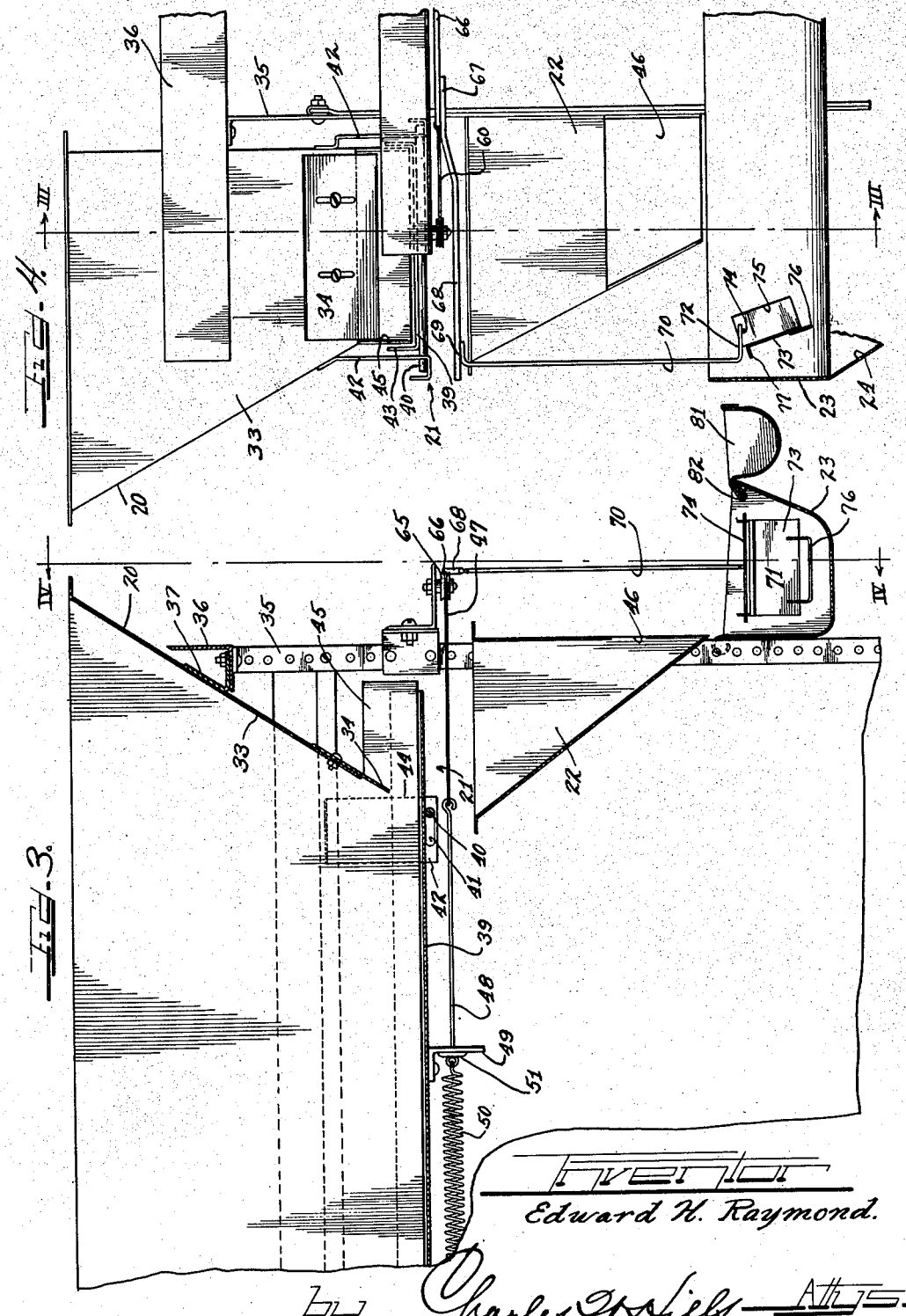

Patented Sept. 22, 1936

2,055,110

UNITED STATES PATENT OFFICE 2,055,110

BATTERY LAYING CAGE AND METHOD OF FEED DISTRIBUTION THEREIN

Edward H. Raymond, Reading, Mass.

Application June 17, 1933, Serial No. 676,249

17 Claims. (Cl. 119—51)

This invention relates to a battery laying cage for poultry or the like and to a method of distributing feed therein.

On scientifically managed poultry farms it is quite customary to house laying hens in multiple or battery type cages, in which each hen is provided a cage that is separated from the next adjoining cage in the same horizontal tier by wire netting or the like and in which there are a plurality of such horizontal tiers, one above the other. It is customary in installations of this type to provide feed troughs of sufficient capacity to hold two or three days supply of grain or other feed, in order to reduce the manual attention necessary to keep the hens provided with food. Either individual or group feed troughs and water cups have heretofore been used. A long continuous water trough would be very desirable, but with the arrangement described, the continuous water trough is not feasible unless the feed trough is narrow enough to permit the water trough to be located within reach of the hen. The oversize capacity of the feed trough has heretofore prevented such an arrangement of a continuous water trough.

My present invention contemplates the provision of continuously extending feed troughs of relatively small capacity and sufficiently narrow to permit the mounting of continuous water troughs along the front edge of and continuous with the feed troughs. My invention also contemplates means for and a method of automatically distributing feed to the troughs positioned along each horizontal tier of cages and from one trough to the next trough below.

It is therefore an important object of this invention to provide a means for and a method of automatically distributing feed in battery laying cages in order to minimize the manual labor required in attending such cages.

It is a further important object of this invention to provide automatically operated means for continuously distributing the feed in each trough supplying a horizontal tier of cages in a battery laying cage and to deliver the excess of feed from one trough to the trough next below for distribution there.

It is a further important object of this invention to provide a feed distribution system for battery laying cages in which the feed troughs are relatively narrow and continuous along each horizontal tier of cages and water troughs are mounted from the front lips of the feed troughs within reach of the hens in the cages.
Other and further important objects of this invention will be apparent from the disclosures in the specification and the accompanying drawings.

This invention (in a preferred form) is illustrated in the drawings and hereinafter more fully described.

In the drawings:

Figure 1 is a diagrammatic front view of a battery laying cage embodying the principles of my invention.

Figure 2 is an end elevational diagrammatic view of the same with the ends of the troughs removed, and showing suspension straps for supporting the cage and portions of the feed distributing mechanism mounted thereon.

Figure 3 is an enlarged partial sectional view taken substantially on the line III—III of Fig. 4.

Figure 4 is a partial sectional view taken substantially on the line IV—IV of Fig. 3.

Figure 5 is a simplified end diagrammatic view in elevation showing the drive for the cords of the feed distribution mechanism, omitting details of cage and pulley supports and also omitting the troughs and feed moving paddles.

Figure 6 is a diagrammatic view of a modified form of the arrangement of cords and the cord-driving motor.

As best shown in Figs. 1, 2 and 5, the reference numeral 10 indicates a battery laying cage comprising a large number of cages arranged in a plurality of superposed horizontal tiers 11, 12, 13 and 14. Angle irons shown in Figures 2 and 5 connected to the cage bottoms 81' are not part of the invention claimed, and, to avoid confusion of lines, are not shown in Figure 1. Each tier may suitably be so constructed as to be of sufficient depth to provide space for two lines of individual cages 15, as indicated by the dotted line 100 (Fig. 2). The battery laying cage 10 may be suspended as a unit by means of perforated metal suspension straps 16 and 17 or other suitable means from structural horizontal supporting beams 18 and 19, respectively. The cage is of sheet metal, metal strap and wire netting construction to enable it to be readily cleaned and to be kept in a sanitary condition, and the cages are provided with conventional front barriers such, for instance, as are shown in the Collis Patent 1,276,723 of August 27, 1918.

The general arrangement of a battery laying cage of my invention includes the provision of a main feed hopper 20 near the top of the cage and extending along one end thereof, hereinafter referred to as the feed end. Said hopper is provided with a sliding plate feed device indicated generally at 21, that permits the feed to drop into chutes 22 that open into the upper feed troughs 23 extending along the sides of the unit. Since both sides of the battery laying cage are identical, it will be sufficient to describe one side only and for convenience the side showing in Fig. 1 will be referred to as the front side.

An overflow spout 24 at the feed end of the troughs 23 provides a direct overflow of feed into the next trough below, indicated by the reference numeral 25. Another spout 26 discharges from the other end of the troughs 23 (hereafter referred to as the drive end of the cage) into said trough 25. Similarly, the trough 25 is provided with a discharge spout 27 at the feed end and an overflow spout 27a at the drive end of the cage, both spouts emptying into the trough 28 therebelow. From said trough 28 a connecting spout 29 at the drive end and an overflow spout 29a at the feed end discharge into a bottom trough 30. Overflow pans 31 are provided for catching any feed overflowing from the trough 30 through spouts 32 and 32a.

As best shown in Figs. 3 and 4, the feed supply hopper 20 comprises a sheet metal container having inwardly sloping walls, the walls 33 at the front and rear sides of the battery cage being provided with adjustable lower lips 34. Suspension straps 35 are attached by means of angle irons 36 and 37 to said walls 33 for supporting other portions of the feed distributing mechanism.

The feed supply hopper 20 is provided with the reciprocating plate feeder 21, previously referred to, which comprises a bottom closure plate 39 extending beyond the ends of the opening of the hopper 20 and reciprocally mounted upon rollers 40, carried by said plate and moving in elongated slots 41 of straps 42 secured to the hopper walls. Said closure plate 39 is further provided laterally with relatively shallow upstanding flanges 43 that extend outside of the lower portion of the hopper side walls. The adjustable lip 34, mounted on each of the hopper walls 33 at the front and rear sides of the unit, terminates short of the closure plate 39 to provide a gate 44 through which the grain or other feed contained in the hopper may pass when the plate 39 is reciprocated. The longer walls of the hopper 20 near their lower extremities are continued forwardly as at 45 beyond said gate 44 to prevent lateral spilling over of the feed. As the reciprocating plate 39 is drawn toward the rear of the battery cage, by means about to be explained, the feed discharges over the forward end of said plate 39 into a chute 22 and thence through an opening 46 in said chute front wall into the top trough 23 on the front side of the cage.

The closure plate 39 has a reciprocating movement of say 2 inches, as represented by the length of the slot 41. This amount of displacement is sufficient to discharge a small amount of feed on each stroke of the plate 39, first into a trough 23 at one side of the unit and then into the other trough 23 at the other side. The mechanism for moving the closure plate 39 is a part of the general mechanism for feed distribution.

As best shown in Figs. 2 and 3, this plate operating mechanism includes a length of wire or cord 47 having its ends secured to heavier wire rods 48. Said rods 48 extend through apertures in a pair of spaced angle pieces 49 on the plate 39 and are connected to the ends of a helically coiled spring 50. Each of the rods 48 carries a button or washer 51 that is held in one direction against the eye formed at the end of the rod lying inside the adjacent angle piece or stop 49. As the wire 47 is moved back and forth, in a manner later to be explained, a button or washer 51 on a rod 48 engages an angle piece 49 and moves the plate 39 in one direction or the other. The length of travel of the plate 39 is limited by the engagement of the rollers 40 with the ends of the elongated slots 41. As the wire 47 moves in one direction, one rod 48 slips through the aperture in the adjacent angle piece 49 and the button 51 on the other rod 48 moves along until it engages the other angle piece 49 to move the plate 39. In this way the plate 39 is moved first in one direction and then in the other to permit an intermittent discharge of the feed through the gates 44 into the chutes 22.

The main driving force for moving the wire 47, and also for moving other wires of the feed distributing mechanism, may suitably be a motor 53 mounted on top of the battery cage and connected through a set of reducing gears 54 to a revolving crank arm 55 (Fig. 1). Said arm 55 is provided with a plurality of collars 56, 57, 58 and 59 to which are attached cords 60, 61, 62 and 63, whereby said cords are continuously moved, first in one direction and then in the other. Grooved rollers 38 are mounted near the corners of the drive and feed ends of the cage to guide these cords along the front and rear sides of the unit.

The cord 60 is trained around pulleys 64 (Fig. 1) to extend along both sides of the battery laying cage and around pulleys or grooved rollers 65 at the feeding end of the cage. The run 47 of said cord 60 is connected as previously described to the spring 50. The spring 50 in the cord system 60 and the springs 80 in the other cord system serve merely to maintain tension and take up slack.

As best shown in Figs. 3 and 4, the cord 60 is connected to lengths of heavier wire 66 that extend practically the full length along the front and rear sides of the cage. At spaced intervals along the wires 66, there are attached thereto, as at 67, by welding or otherwise, offset rods 68. Each of said rods 68 carries at its free end, as at 69, a drop arm 70 of a paddle 71. Each of said drop arms 70 has a lower bent end 72 and a blade 73 secured thereto by means of a transversely extending pin 74. Said pin 74 may suitably be welded to the bent end 72. Each blade 73 is provided at its ends with flanges 75, which are apertured adjacent their upper edges to receive the ends of a pin 74, thereby permitting said blades 73 to swing about the pins 74. A loop of wire 76 is secured to and extends below the lower edge of a blade 73 as a prong to aid in distributing the feed in the trough 23. Each blade 73 is also provided with a flange 77 along its upper edge which serves to hold the blade 73 from swinging in one direction by contact with the bent end 72 of the rod 70 while permitting free swinging of the blade in the other direction.

The arrangement of cords and of paddles in each of the other troughs, 25, 28 and 30, is substantially the same as the arrangement described in connection with the uppermost trough 23. The cords 61, 62 and 63 extend around pulleys 78 and 79, at the drive and feed ends of the battery laying cage, respectively, and are connected at the feed end to tensioning springs 80. The runs of the cords 60, 61, 62 and 63 along the sides of the battery laying cage are each provided with some suitable cord-supporting means, and which, for example, may comprise strips 81 and 82 shaped to afford slots into which may extend supporting rollers 83 and 84. The runs of the cords along the sides of the battery laying cage are thus, by the means suggested, maintained in parallel spaced relation to the troughs into which extend the paddles 71. The supporting means 81—84 are merely suggestive, and are not claimed as part of the invention.

In operation, the motor 53 drives the crank arm 55 through the speed reducing gears 54. As the arm 55 travels over the upper portion of its circular path, the cords 60, 61, 62 and 63 are moved toward the drive end of the cage along one of the horizontal passes and in the other direction along the other horizontal pass. In the case of the cord 60, as the horizontal run 47 of the cord is drawn in one direction, a washer or button 51 on a rod 48 is drawn into engagement with an angle piece 49 and moves the bottom closure plate 39 in the same direction to close the flow of feed through the gate 44 into the chute 23 at that side of the cage, and to open the flow of feed through a similar gate at the other side of the cage.

When the crank arm 55 is moving in the lower portion of its arc, the wire or cord 60 moves in the opposite direction to draw the washer 51 out of engagement with its angle piece 49 and to cause the other washer 51 to move into engagement with the other angle piece 49 and move the closure plate 39 back in the other direction to open the flow of feed through the gate 44 into the chute 23 and thus into the trough 23 on the front side of the cage. The reciprocation of the bottom closure plate 39 continues so long as the motor 53 is in operation to effect an intermittent feed of material from the hopper 20 into the uppermost troughs 23.

Simultaneously with the action of the sliding plate feed, the paddles in each of the troughs 23, 25, 28 and 30, are likewise reciprocated, the movement of the crank arm 55 causing movement of the paddles in one direction and then in the opposite direction. The length of travel of the paddles will, obviously be controlled by the throw of the crank arm 55 and ordinarily will be in the neighborhood of 14 inches.

As the paddles travel in one direction, the blades 73 will be held against swinging by engagement of the flanges 77 with the bent ends 72 of the drop arms 70. Therefore, when traveling in that direction, the blades 73 will scrape over the feed in the bottoms of the troughs and advance the feed in the direction of travel of the paddles. When the paddles are traveling in the reverse direction, the blades 73 are free to swing so that they will drag over the surface of the feed in the trough without substantially advancing the feed in the direction of travel of the paddles. The prongs 76 serve merely to agitate or turn over the feed in the troughs.

The paddles are preferably so arranged that they will advance the feed in successive troughs in opposite directions, that is, the paddles traveling in the troughs 23 will advance the feed toward the discharge spouts 26 and the paddles in the troughs 25 next below will advance the feed in the opposite direction toward the discharge spouts 27, and so on. The feed is thus distributed from a common hopper 20 first into the upper trough 23 and thence by way of either the overflow spouts 24 or the discharge spouts 26 into the next lower troughs 25, from there by way of the spouts 27 or 27a into the next lower trough 28, and thence by way of the spouts 29 or 29a into the lowermost trough 30. Said trough 30 is provided with discharge spouts 32 and 32a at its ends for permitting any overflow of feed to drop into overflow pans 31.

The overflow spouts 24, 27a, and 29a prevent the feed from building up at the corresponding ends of the troughs 23, 25 and 28 on the back strokes of the conveyors in those troughs. The feeding stroke is so arranged that when discharge of feed from the hopper 20 in the top trough 23 occurs, the nearest paddle 71 is in position to pick up the fresh deposit of feed and pass it along the trough to a point within reach of the next paddle on its succeeding stroke.

The feed distribution system of my invention thus permits an automatic distribution of the feed from a common supply hopper to all of the cages in the battery, with a minimum of manual attendance. In addition to the regulation of the rate of distribution of feed that can be accomplished by controlling the throw and speed of rotation of the crank arm 55, the rate of feed distribution can also be regulated by the adjustable lips 34 on the hopper 20. In this way, the rate of distribution of the feed can be carefully controlled so that there will be practically no excess of feed delivered to the troughs over that required by the hens for consumption.

Since under these circumstances, the feed troughs need be of only small capacity, it is feasible to mount a water trough 81 along the outer edge of each of the feed troughs. As best shown in Fig. 3, the feed troughs and water troughs may both be formed of sheet metal, with the adjacent edges of both troughs provided with interlocking flanges as at 82 so as to permit the removal of the water troughs when desired.

In Fig. 6, there is shown a slightly modified arrangement of means for moving the cords, wherein a motor 53a is positioned at a distance, or at a point remote from the battery laying cage. Said motor 53a is provided with a crank arm carrying a collar 85, to which is attached an endless cord 87. Said cord 87 extends completely around a battery laying cage 88, or a series of such cages, and is guided by rollers 86 which are suitably supported by means not shown and not claimed. A weight 89 serves as a tensioning means for the cord. Each battery laying cage 88 is provided with an arm 90, pivoted as at 91 to an end wall or brace thereon of the battery cage. At its upper free end, the arm 90 is secured, as at 92, to the cord 87 and also, at a point 93 therebelow to a cord or series of cords 94 that extend around the battery laying cage 88 in the same manner as previously described.

The reciprocation of the paddles is slow so that there is plenty of time for the hens to peck the food out of the troughs without being hit by the paddles.

The arrangement thus provided is adapted for use in connection with series of battery laying cages where a single remote control is desirable.

It will be understood that while the invention has been specifically described and illustrated in connection with a battery laying cage, it is of wider application for the general distribution and conveying of feed materials and the like in multi-storied animal houses and elsewhere.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a battery laying cage, a plurality of horizontally arranged tiers of cages, feed troughs extending along each of said tiers, each of said troughs above the bottom trough having an overflow spout to a trough below, and means reciprocally mounted with respect to said troughs for advancing feed in each of said troughs and from one trough through its overflow spout to the next trough below.

2. In a battery laying cage, horizontally arranged cages, a trough positioned in front and the full length of said cages, paddles movable in said trough above the bottom thereof, means for reciprocating said paddles to distribute feed in said trough and means on said paddles for agitating the feed in the trough between the bottom of the paddles and the bottom of the trough.

3. In a battery laying cage including a plurality of horizontally arranged tiers of cages, a container for feed mounted above said cages, a reciprocating bottom closure for said container, a trough extending along each tier of cages and having an overflow spout to the next trough below if any, means for discharging feed from said container to said trough, paddles reciprocally mounted in said troughs operative in one direction to advance feed therealong, and means connected to said bottom closure and to said paddles for reciprocating the same.

4. In a battery laying cage including a plurality of horizontally arranged tiers of cages, a container for feed mounted above said cages, a reciprocating bottom closure for said container, a trough extending along each tier of cages and having an overflow spout to the next trough below if any, means for discharging feed from said container to said trough, paddles reciprocally mounted in said troughs operative in one direction to advance feed therealong, a driven member and wires associated with said member and connected to said bottom closure and to said paddles to move the same in two directions.

5. In a battery laying cage including a plurality of horizontally arranged tiers of cages, a container for feed mounted above said cages, a reciprocating bottom closure for said container, a trough extending along each tier of cages and having an overflow spout to the next trough below if any, paddles reciprocally mounted in said troughs and having a slight clearance above the bottoms of said troughs and operative in one direction to advance feed therealong, and means connected to said bottom closure and to said paddles for reciprocating the same to discharge feed from said container to the topmost trough and from each trough through one of said spouts to the next trough below if any.

6. In a battery laying cage having a plurality of tiers of cages, a feed hopper, a continuous trough for each tier with a connecting spout for delivery into the trough next below if any, means for discharging feed from said hopper into the topmost trough, means for distributing feed in each trough and into said connecting spouts, and a common actuating means for operating both said feed discharging and feed distributing means.

7. In combination with a multi-storied housing, an elevated feed hopper, a continuous trough for each story with a connecting spout for delivery into the trough next below if any, a reciprocating bottom closure for discharging feed from said hopper into the topmost trough, reciprocating suspended paddles for distributing feed in each trough and into said connecting spouts, and a common actuating means including a plurality of cables connected to said closure and said paddles for automatically reciprocating the same.

8. A feed distributing mechanism comprising a plurality of horizontally arranged feed troughs having connecting spouts from one trough to the next trough below if any, a system of cords having runs paralleling said troughs, paddles suspended from said runs of cords to drag over the feed in said troughs and to distribute said feed in said troughs and from one trough through said connecting spouts to the next trough below, and means for moving said cords in two directions whereby said cables are reciprocated.

9. A feed distributing mechanism comprising a plurality of horizontally arranged feed troughs having connecting spouts from one trough to the next trough below if any, a system of cords having runs paralleling said troughs, paddles suspended from said runs of cords to drag over the feed in said troughs and to distribute said feed in said troughs and from one trough through said connecting spouts to the next trough below, and means including a motor and a crank arm for moving said cords in two directions whereby said cords are reciprocated.

10. In a feed distributing mechanism, a plurality of troughs for containing feed, paddles having blades freely tiltable in one direction and rigid in the other positioned in spaced relation to the bottoms of said troughs to distribute said feed therein, continuous cords from which said paddles are suspended, and means including a motor driven crank arm in engagement with said cords to move the same in opposite directions, whereby said paddles are reciprocated.

11. In an animal housing system having a plurality of horizontal tiers of cages, a continuous feed trough extending the full length of each tier and a continuous water trough secured along and carried by the outer lip of said feed trough.

12. In a battery laying cage having a plurality of horizontal tiers of cages, a continuous feed trough extending the full length of each tier, a continuous water trough secured along the outer lip of said feed trough, and means reciprocating in each feed trough for distributing the feed therein.

13. The method of distributing feed in battery laying cages having a plurality of horizontally arranged tiers of cages, which comprises advancing the feed in continuous streams lengthwise of each tier of cages and cascading said feed from one stream to the next stream below.

14. The method of distributing feed in battery laying cages having a plurality of horizontally arranged tiers of cages, which comprises flowing feed intermittently from an elevated supply into a horizontally disposed channel therebeneath and advancing the feed in continuous streams lengthwise thereof and of each tier of cages and cascading said feed from one stream to the next stream below.

15. The method of distributing feed in battery layer cages which comprises advancing the feed in parallel superposed streams accessible to each cage and cascading the feed by gravity from one stream to the next below.

16. In a battery laying cage, in combination with horizontally arranged cages, a trough positioned in front along the full length of each cage, paddles suspended in said trough in spaced relation therefrom, means for effecting relative movement between said trough and paddles to distribute feed in said trough, and means on said paddles for agitating the feed in the space between the paddles and the trough.

17. In a battery laying cage, a first feed trough having a discharge spout, a second feed trough adapted to receive feed from said discharge spout, a feed hopper having means movable to cause an intermittent discharge of feed from said hopper to said first trough, and means connected to and movable with said first means to intermittently push feed along said first and said second troughs.

EDWARD H. RAYMOND.